(12) United States Patent
Hyuga (10) Patent No.: US 10,917,590 B2
(45) Date of Patent: Feb. 9, 2021

(54) IMAGING CONTROL DEVICE, IMAGING APPARATUS, AND IMAGING CONTROL METHOD (71) Applicants: KABUSHIKI KAISHA TOSHIBA, Minato-ku (JP); TOSHIBA ELECTRONIC DEVICES & STORAGE CORPORATION, Minato-ku (JP)

(72) Inventor: Fumihiko Hyuga, Kawasaki (JP)

(73) Assignees: KABUSHIKI KAISHA TOSHIBA, Minato-ku (JP); TOSHIBA ELECTRONIC DEVICES & STORAGE CORPORATION, Minato-ku (JP)

( * ) Notice: Subject to any disclaimer, the term of this patent is extended or adjusted under 35 U.S.C. 154(b) by 128 days.

(21) Appl. No.: 16/127,477

(22) Filed: Sep. 11, 2018

(65) Prior Publication Data
US 2019/0297285 A1   Sep. 26, 2019

(30) Foreign Application Priority Data

Mar. 20, 2018   (JP) ................. 2018-052912

(51) Int. Cl.
*H04N 5/355* (2011.01)
*H04N 5/353* (2011.01)
*H04N 5/225* (2006.01)

(52) U.S. Cl.
CPC ....... *H04N 5/35581* (2013.01); *H04N 5/2258* (2013.01); *H04N 5/353* (2013.01)

(58) Field of Classification Search
CPC ... H04N 5/35581; H04N 5/2258; H04N 5/353
See application file for complete search history.

(56) References Cited

U.S. PATENT DOCUMENTS 7,382,931 B2   6/2008   Kang et al.
8,150,201 B2   4/2012   Kasai et al.
(Continued)

FOREIGN PATENT DOCUMENTS

EP   2 733 927 A1   5/2014
JP   2008-227697   9/2008
(Continued)

OTHER PUBLICATIONS

"High Dynamic Range Video," Online Submission ID: 125, pp. 6.

*Primary Examiner* — Twyler L Haskins
*Assistant Examiner* — Fayez Bhuiyan
(74) *Attorney, Agent, or Firm* — Oblon, McClelland, Maier & Neustadt, L.L.P.

(57) ABSTRACT

An imaging control device includes a combiner configured to generate a combined image on the basis of a first image captured in a first exposure time and a second image captured in a second exposure time longer than the first exposure time and an exposure time controller configured to control at least one of the first exposure time and the second exposure time on the basis of a number of pixels of at least one of saturated pixels having pixels values equal to or larger than a predetermined value and black pixels having pixel values equal to or smaller than the predetermined value in the combined image and a value concerning a luminance value of the combined image.

13 Claims, 9 Drawing Sheets (56) References Cited

U.S. PATENT DOCUMENTS

| | | |
|---|---|---|
| 8,848,063 B2 | 9/2014 | Jo et al. |
| 2003/0210345 A1 | 11/2003 | Nakamura et al. |
| 2012/0262600 A1 | 10/2012 | Velarde et al. |
| 2013/0242152 A1* | 9/2013 | Kasai .................. H04N 5/2353 |
| | | 348/294 |
| 2015/0244917 A1 | 8/2015 | Huang et al. |

FOREIGN PATENT DOCUMENTS

| | | |
|---|---|---|
| JP | 2008-228058 A | 9/2008 |
| JP | 2011-176880 A | 9/2011 |
| JP | 2012-29029 | 2/2012 |
| JP | 2012-234393 | 11/2012 |

* cited by examiner

|  | LOW | HIGH |
|---|---|---|
| NUMBER OF SATURATED PIXELS | ↑ | ↓↓ |
| AVERAGE LUMINANCE | ↑ | ↓ |
| NUMBER OF BLACK PIXELS | -- | -- |

FIG. 3

|  | LOW | HIGH |
|---|---|---|
| NUMBER OF SATURATED PIXELS | -- | -- |
| AVERAGE LUMINANCE | ↑ | ↓ |
| NUMBER OF BLACK PIXELS | ↓ | ↑↑ |

IMAGING CONTROL DEVICE, IMAGING APPARATUS, AND IMAGING CONTROL METHOD

CROSS-REFERENCE TO RELATED APPLICATIONS

This application is based upon and claims the benefit of priority from Japanese Patent Application No. 2018-052912, filed on Mar. 20, 2018; the entire contents of which are incorporated herein by reference.

FIELD

Embodiments disclosed herein relate to an imaging control device, an imaging apparatus, and an imaging control method.

BACKGROUND

To obtain a high dynamic range image, which is an image representing a wide dynamic range, high dynamic range imaging (HDRI) for combining a first image in a short exposure time and a second image in a long exposure time longer than the short exposure image to obtain a combined image is performed. The combined image includes saturated pixels having pixel values equal to or larger than a predetermined value and black pixels having pixel values equal to or smaller than the predetermined value. Imaging control of an exposure time for setting the number of the saturated pixels and the number of the black pixels to target numbers is known.

However, in such imaging control of the exposure time for setting the number of the saturated pixels and the number of the black pixels to the target numbers, it is likely that the luminance of an image fluctuates and a combined image hard to be visually recognized is generated.

DETAILED DESCRIPTION

An imaging apparatus according to an embodiment of the present invention is explained in detail below with reference to the drawings. Note that embodiments explained below are examples of the embodiment of the present invention. The present invention is not interpreted to be limited to these embodiments. In the drawings referred to in this embodiment, the same portions or portions having the same functions are denoted by the same or similar reference numerals and signs. Redundant explanation of the portions is sometimes omitted. Dimensional ratios of the drawings are sometimes different from actual ratios for convenience of explanation. A part of components is sometimes omitted from the drawings.

Embodiment

Figure 1:
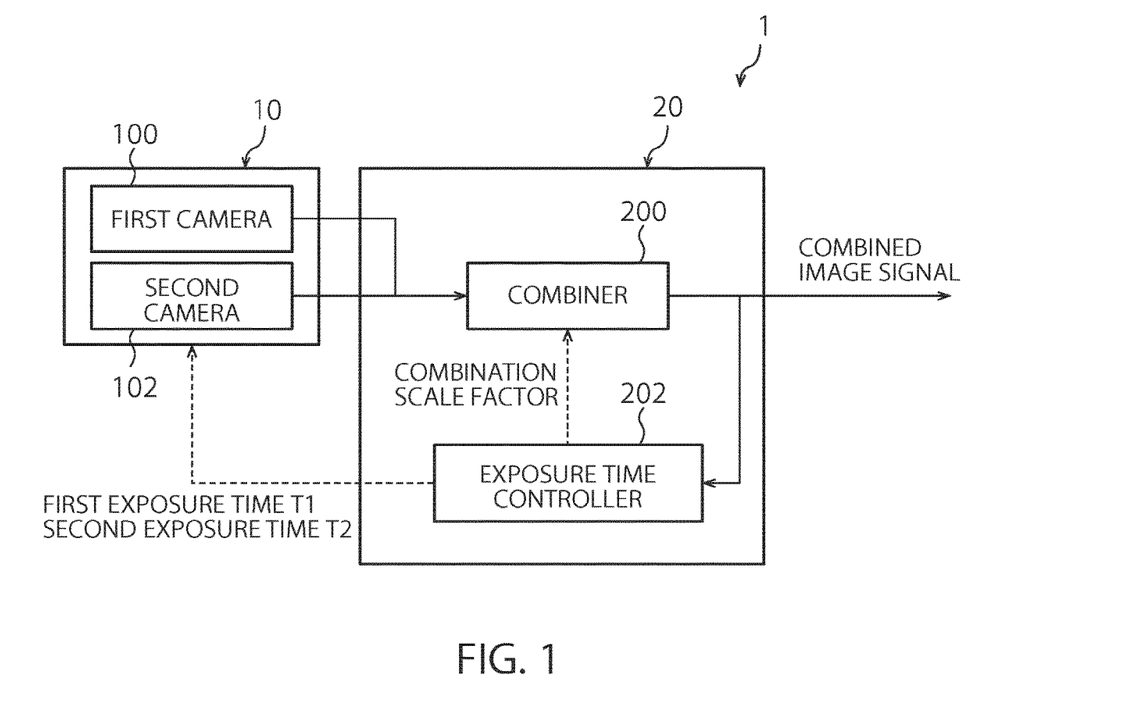
FIG. 1 is a block diagram showing an overall configuration of an imaging apparatus according to an embodiment.

FIG. 1 is a block diagram showing an overall configuration of an imaging apparatus 1 according to an embodiment. As shown in FIG. 1, the imaging apparatus 1 is a device that performs high dynamic range imaging (HDRI). The imaging apparatus 1 includes a camera 10 and an imaging control device 20.

The camera 10 is a device capable of acquiring a plurality of images in different exposure times. The camera 10 includes a first camera 100 and a second camera 102. The first camera 100 is, for example, an imaging sensor in which pixels are arranged in a two-dimensional planar shape. The first camera 100 captures a first image according to a control signal including a first exposure time T1 input from the imaging control device 20.

The second camera 102 has a configuration equivalent to the configuration of the first camera 100. The second camera 102 captures a second image according to a control signal including a second exposure time T2 input from the imaging control device 20. When the first exposure time T1 and the second exposure time T2 are different, the second exposure time T2 is set longer than the first exposure time T1. That is, a camera on a low pixel exposure side is the first camera 100. A camera on a high pixel exposure side is the second camera 102.

An exposure time is a time in which light is irradiated on imaging sensors of the first camera 100 and the second camera 102. A frame rate of the first camera 100 and the second camera 102 is, for example, 60 frames per second (fps). Therefore, a longest exposure time of the first camera 100 and the second camera 102 is 1/60 second. In this way, the exposure time is limited by the frame rate.

The imaging control device 20 is a device that generate a combined image obtained by high dynamic range combination and controls an exposure time of the camera 10. The imaging control device 20 includes a combiner 200 and an exposure time controller 202.

The combiner 200 combines a first image captured with the first exposure time T1 and a second image captured with the second exposure time T2. That is, a combination scale factor is T2/T1.

However, as a filter of low pixels, a filter having transmittance 1/N (N>=1) times as high as the transmittance of high pixels is sometimes used. A combination scale factor in that case is represented as N*T2/T1. In this specification, for simplification, a filter in the case of N=1 (high transmittance and low transmittance of the filter are the same) is explained. However, the filter is not limited to this.

The exposure time controller 202 generates a control signal including the first exposure time T1 and the second exposure time T2 and controls the camera 10. The exposure time controller 202 may include a central processing unit (CPU).

Figure 2:
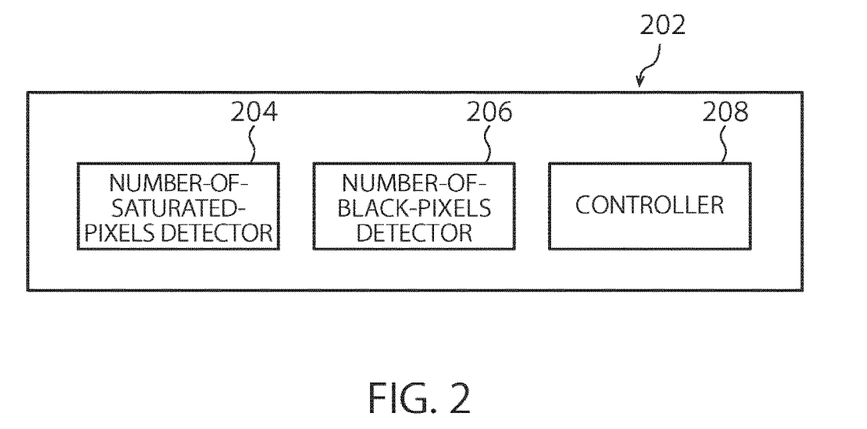
FIG. 2 is a block diagram showing a detailed configuration of an exposure time controller.

FIG. 2 is a block diagram showing a detailed configuration of the exposure time controller 202. As shown in FIG. 2, the exposure time controller 202 includes a number-of-saturated-pixels detector 204, a number-of-black-pixels detector 206, and a controller 208.

The number-of-saturated-pixels detector 204 detects saturated pixels having pixel values equal to or larger than a predetermined value out of a combined image generated by the combiner 200. That is, the predetermined value is a pixel value specified by a dynamic range of the combined image and corresponds to, for example, a maximum pixel value.

The number-of-black-pixels detector 206 detects black pixels having pixel values equal to or smaller than the predetermined value out of the combined image generated by the combiner 200. That is, the predetermined value is a pixel value specified by a dynamic range of the combined image and corresponds to, for example, an average of pixels values of an image captured in a state in which the camera 10 is shielded from light.

The controller 208 controls at least one of the first exposure time and the second exposure time on the basis of at least one of the number of saturated pixels detected by the number-of-saturated-pixels detector 204 and the number of black pixels detected by the number-of-black-pixels detector 206 and a value concerning a luminance value of a combined image generated by the combiner 200. The value concerning the luminance value is a statistical amount of a pixel value in the combined image such as average luminance of the combined image or a median value of the combined image. Note that the pixel value of the combined image corresponds to a luminance value.

Figure 3:
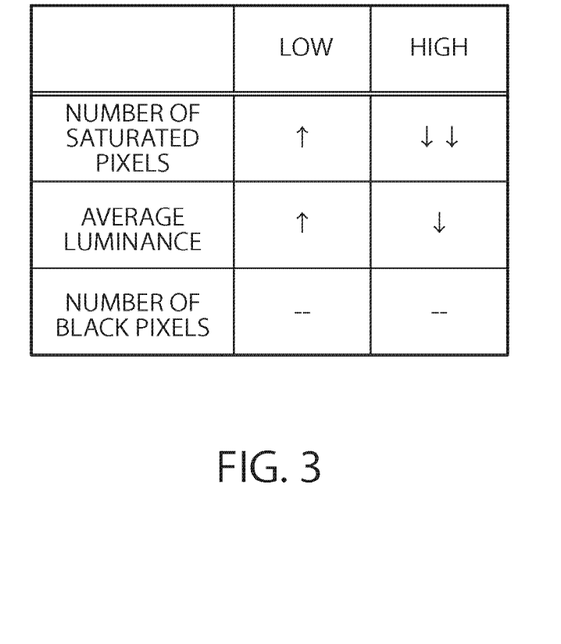
FIG. 3 is a control conceptual diagram of a first exposure time.

FIG. 3 is a control conceptual diagram of the first exposure time T1. As shown in FIG. 3, when average luminance is higher than a target value, the controller 208 sets the first exposure time T1 shorter than the first exposure time T1 in the present state to reduce the average luminance. When the number of saturated pixels is larger than a target value, the controller 208 sets the first exposure time T1 shorter than the first exposure time T1 in the present state to reduce the number of saturated pixels. On the other hand, when the average luminance is lower than the target value, the controller 208 sets the first exposure time T1 longer than the first exposure time T1 in the present state to increase the average luminance. When the number of saturated pixels is smaller than the target value, the controller 208 sets the first exposure time T1 longer than the first exposure time T1 in the present state to increase the number of saturated pixels. On the other hand, concerning the number of black pixels, by multiplying each pixel value of the first image by the combination scale factor, the pixel values of the first image become larger than the black pixel values. Further, a dark image region near the black pixel value can be combined into a satisfactory image with less noise when pixel values of the second image captured in a longer exposure time is used. Therefore, the black pixels of the first image are not used as the black pixels in the combined image. Accordingly, the number of black pixels in the combined image cannot be adjusted by the first exposure time T1. In this way, the controller 208 has an auto exposure (AE) function for adjusting the first exposure time T1 such that the average luminance value of the combined image approaches the target value.

Figure 4:
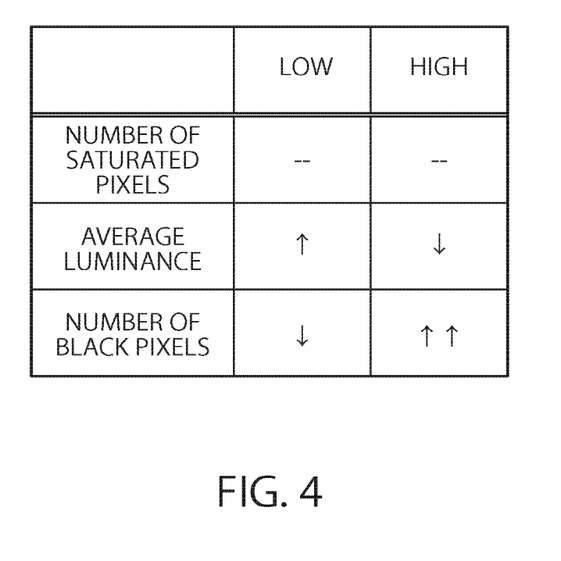
FIG. 4 is a control conceptual diagram of a second exposure time.

FIG. 4 is a control conceptual diagram of the second exposure time T2. As shown in FIG. 4, when the average luminance is higher than the target value, the controller 208 sets the second exposure time T2 shorter than the second exposure time T2 in the present state to reduce the average luminance. When the number of black pixels is larger than a target value, the controller 208 sets the second exposure time T2 longer than the second exposure time T2 in the present state to reduce the number of black pixels. On the other hand, when the average luminance is lower than the target value, the controller 208 sets the second exposure time T2 longer than the second exposure time T2 in the present state to increase the average luminance. When the number of black pixels is smaller than the target value, the controller 208 sets the second exposure time T2 shorter than the second exposure time T2 in the present state to increase the number of black pixels. On the other hand, concerning the number of saturated pixels, a saturated portion of the second image has a pixel value obtained by multiplying pixels of the first image by the combination scale factor. Therefore, pixels of the second image are not used. The number of saturated pixels in the combined image cannot be adjusted by the second exposure time T2. In this way, the controller 208 has an auto exposure (AE) function for adjusting the second exposure time T2 such that the average luminance value of the combined image approaches the target value.

Figure 5:
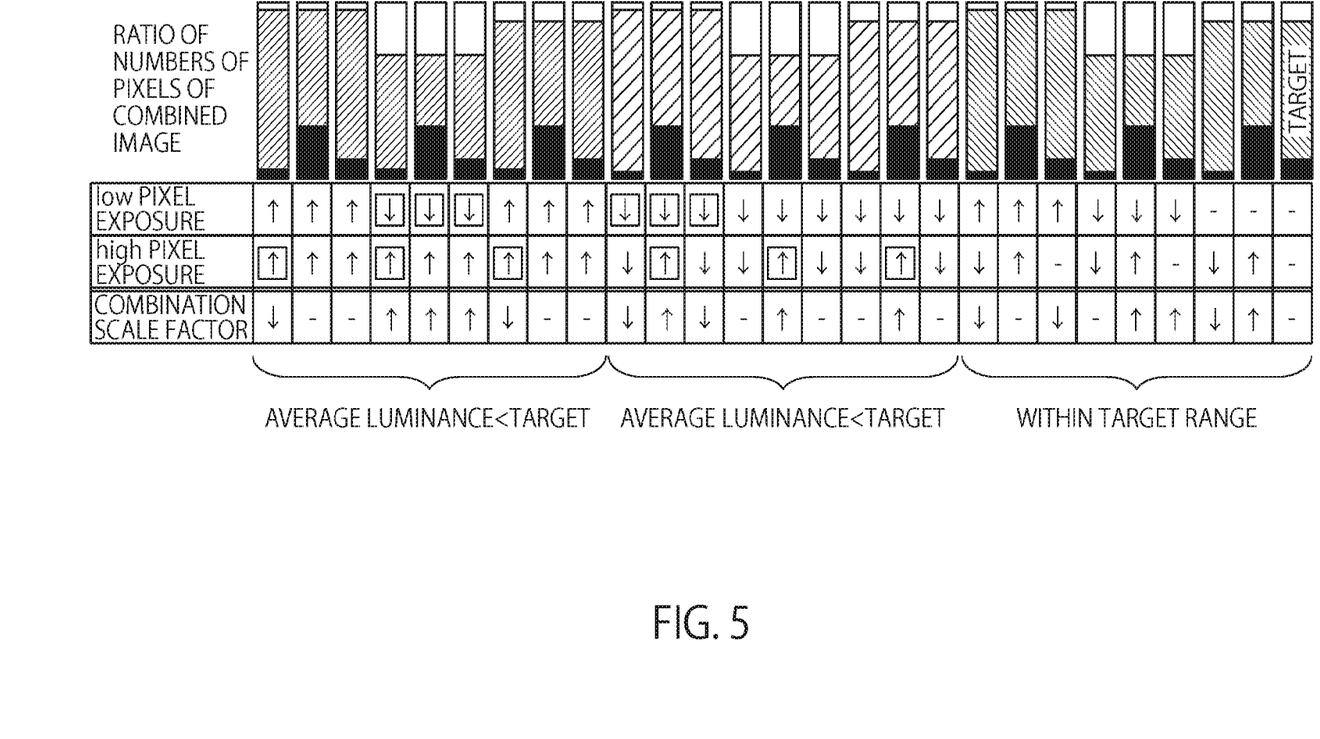
FIG. 5 is a control conceptual diagram of the first and second exposure times.

FIG. 5 is a control conceptual diagram of ratios of the numbers of pixels of combined images and control of the first and second exposure times. In bar graphs on the upper side, the horizontal axes indicate each of the combined images and the vertical axes indicate ratios of saturated pixels, black pixels, and other pixels as shades. In FIG. 5, white indicates the ratio of the saturated pixels and black indicates the ratio of the black pixels. Three kinds of patterns indicate the ratio of the pixels other than the saturated pixels and the black pixels. Average luminance is indicated by the difference of the patterns. An arrow surrounded by a square indicates that an increase or decrease amount is smaller than an increase or decrease amount indicated by an arrow not surrounded by a square.

In figures on the lower side of the bar graphs, low pixel exposure corresponds to the first exposure time T1, high pixel exposure corresponds to the second exposure time T2, and a ratio of the first exposure time T1 and the second exposure time T2 corresponds to the combination scale factor. An upward arrow indicates an increase, a downward arrow indicates a decrease, and "–" indicates that there is no increase and decrease. The bar graph at the right end indicates an example of a target value. That is, in the bar graph at the right end, a ratio of the number of saturated pixels corresponds to a target number of saturated pixels, a ratio of the number of black pixels corresponds to a target number of black pixels, and gray corresponds to a target luminance value of the pixels other than the saturated pixels and the black pixels.

As shown in FIG. 5, the controller 208 increases or reduces the first exposure time (a time of the low pixel exposure) T1 according to the number of saturated pixels and differentiates increase or decrease amounts of the first exposure time T1 when a value (an average luminance value) concerning a luminance value is higher than a target value and when the value concerning the luminance value is lower than the target value. In this way, the first exposure time T1 is increased and reduced according to the luminance and the number of saturated pixels. Therefore, it is possible to perform control of the first exposure time T1 considering the luminance and the number of saturated pixels. For example, the controller 208 performs control for reducing the first exposure time T1 when the value concerning the luminance value is higher than the target value and the number of saturated pixels is smaller than the target value and increasing the first exposure time T1 when the value concerning the luminance value is lower than the target value and the number of saturated pixels is smaller than the target value.

The controller 208 increases or reduces the second exposure time (a time of the high pixel exposure) T2 according to the number of black pixels and differentiates increase or decrease amounts of the second exposure time T2 when the value concerning the luminance value is higher than a target value and when the value concerning the luminance value is lower than the target value. In this way, the second exposure time T2 is increased and reduced according to the luminance and the number of black pixels. Therefore, it is possible to perform control of the second exposure time T2 considering the luminance and the number of black pixels. For example, the controller 208 performs control for reducing the second exposure time T2 when the value concerning the luminance value is higher than the target value and the number of black pixels is smaller than the target value and increasing the second exposure time T2 when the value concerning the luminance value is lower than the target value and the number of black pixels is smaller than the target value.

Figure 6:
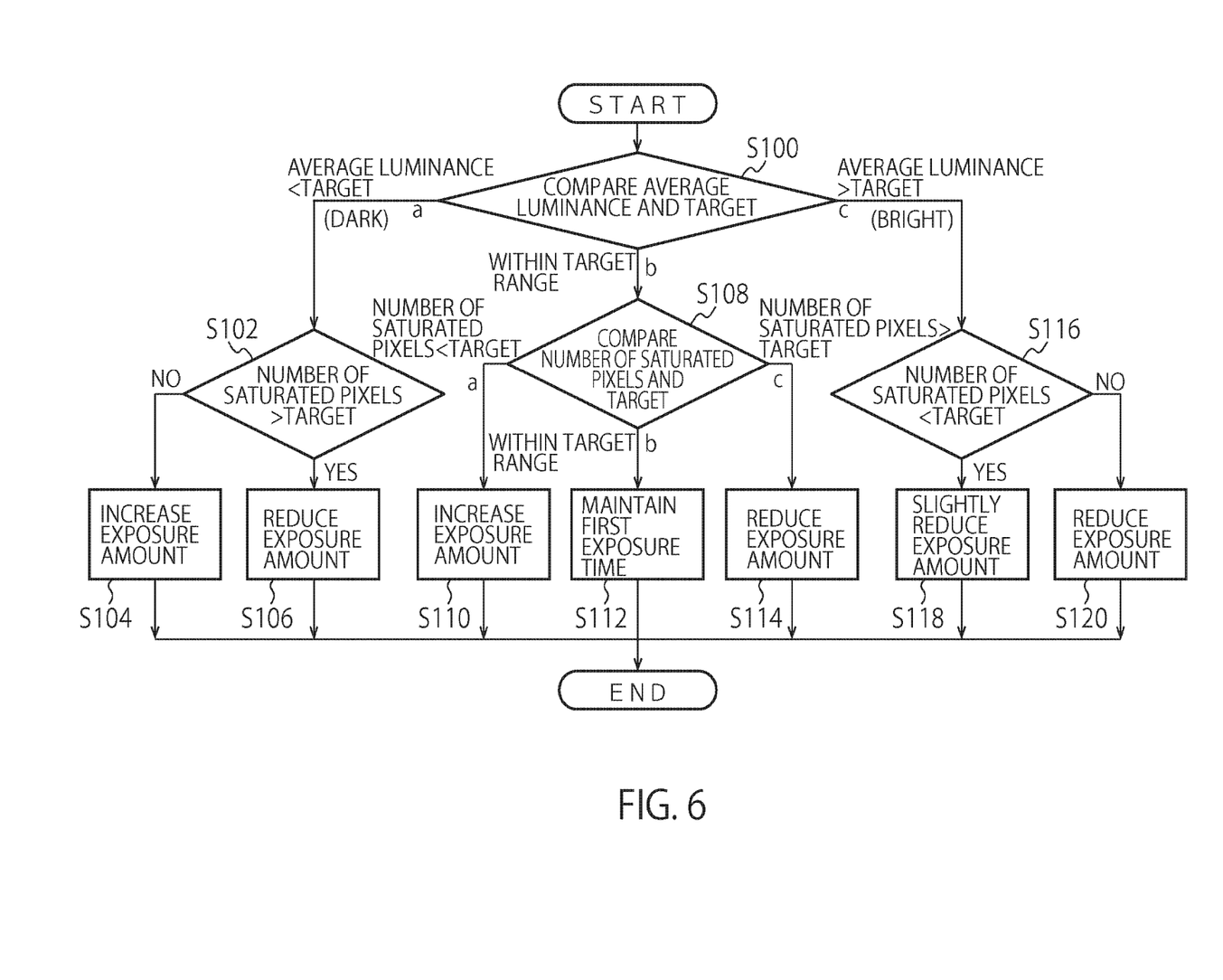
FIG. 6 is a flowchart for explaining a control example of the first exposure time.

FIG. 6 is a diagram showing, in a form of a flowchart, the control example shown in FIG. 5 and is a flowchart for explaining a control example of the first exposure time T1. As shown in FIG. 6, first, the controller 208 compares the average luminance value and the target value of the combined image (step S100).

When the average luminance value is lower than a predetermined range of the target value ("a" in step S100), the controller 208 determines whether the number of saturated pixels is smaller than a number-of-saturated-pixels target value (step S102). When the number of saturated pixels is equal to or smaller than the number-of-saturated-pixels target value (NO in step S102), the controller 208 performs control for increasing the first exposure time T1 (step S104). On the other hand, when the number of saturated pixels is smaller than the number-of-saturated-pixels target value (YES in step S102), the controller 208 performs control for reducing the first exposure time T1 (step S104).

On the other hand, when the average luminance value is within the predetermined range of the target value ("b" in step S100), the controller 208 compares the number of saturated pixels and the number-of-saturated-pixels target value (step S108). When the number of saturated pixels is smaller than the predetermined range of the target value ("a" in step S108), the controller 208 performs control for increasing the first exposure time T1 (step S110). On the other hand, when the number of saturated pixels is within the predetermined range of the target value ("b" in step S108), the controller 208 performs control for maintaining the first exposure time T1 (step S112). On the other hand, when the number of saturated pixels is larger than the predetermined range of the target value ("c" in step S108), the controller 208 performs control for reducing the first exposure time T1 (step S114).

On the other hand, when the average luminance value is higher than the predetermined range of the target value ("c" in step S100), the controller 208 determines whether the number of saturated pixels is smaller than the number-of-saturated-pixels target value (step S116). When the number of saturated pixels is smaller than the number-of-saturated-pixels target value (YES in step S116), the controller 208 performs control for slightly reducing the first exposure time T1 (S118). On the other hand, when the number of saturated pixels is equal to or larger than the number-of-saturated-pixels target value (NO in step S116), the controller 208 performs control for reducing the first exposure time T1 (step S120).

Figure 7:
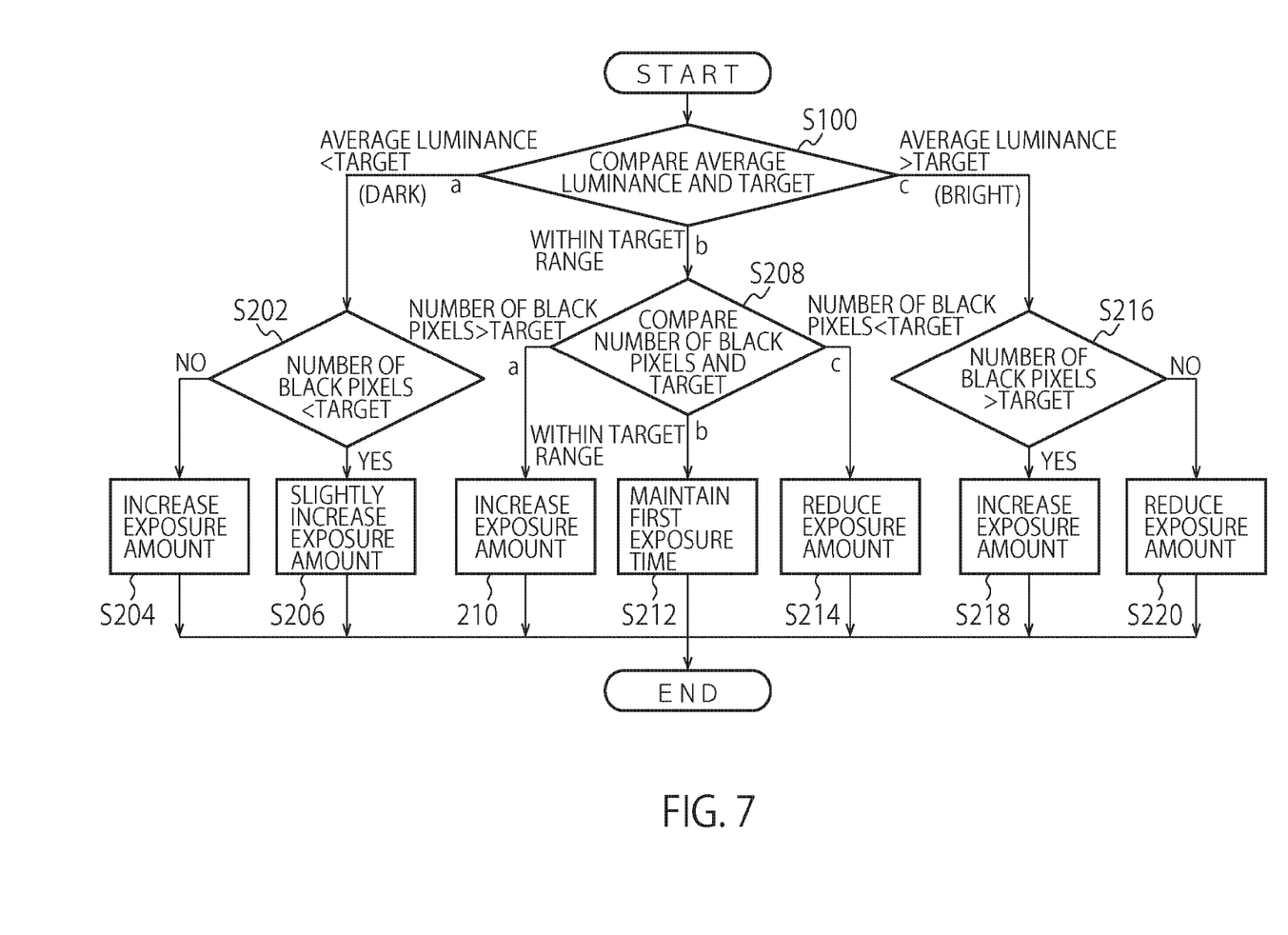
FIG. 7 is a flowchart for explaining a control example of the second exposure time.

FIG. 7 is a diagram showing, in a form of a flowchart, the control example shown in FIG. 5 and is a flowchart for explaining a control example of the second exposure time T2. As shown in FIG. 7, first, the controller 208 compares the average luminance value and the target value of the combined image (step S100).

When the average luminance value is lower than the predetermined range of the target value ("a" in step S100), the controller 208 determines whether the number of black pixels is smaller than a number-of-black-pixels target value (step S202). When the number of black pixels is equal to or larger than the number-of-black-pixels target value (NO in step S202), the controller 208 performs control for increasing the second exposure time T2 (step S204). On the other hand, when the number of black pixels is smaller than the number-of-black-pixels target value (YES in step S202), the controller 208 performs control for slightly increasing the second exposure time T2 (step S206).

On the other hand, when the average luminance value is within the predetermined range of the target value ("b" in step S100), the controller 208 compares the number of black pixels and the number-of-black-pixels target value (step S208). When the number of black pixels is larger than the predetermined range of the target value ("a" in step S208), the controller 208 performs control for increasing the second exposure time T2 (step S210). On the other hand, when the number of black pixels is within the predetermined range of the target value ("b" in step S208), the controller 208 performs control for maintaining the second exposure time T2 (step S212). On the other hand, when the number of black pixels is smaller than the predetermined range of the target value ("c" in step S208), the controller 208 performs control for reducing the second exposure time T2 (step S214).

On the other hand, when the average luminance value is higher than the predetermined range of the target value ("c" in step S100), the controller 208 determines whether the number of black pixels is larger than the number-of-black-pixels target value (step S216). When the number of black pixels is larger than the number-of-black-pixels target value (YES in step S216), the controller 208 performs control for increasing the second exposure time T2 (step S218). On the other hand, when the number of black pixels is equal to or smaller than the number-of-black-pixels target value (NO in step S216), the controller 208 performs control for reducing the second exposure time T2 (step S220).

Note that, when slightly reducing the first exposure time T1, for example, the controller 208 multiplies the present first exposure time T1 by "p". For example, "p" is 0.9 and is set in a register in the controller 208. Similarly, when reducing the first exposure time T1, for example, the controller 208 multiplies the present first exposure time T1 by "r". For example, "r" is 0.7 and is set in the register in the controller 208. Similarly, when greatly reducing the first exposure time T1, for example, the controller 208 multiplies the present first exposure time T1 by "v". For example, "v" is 0.5 and is set in the register in the controller 208.

When slightly increasing the first exposure time T1, the controller 208 multiplies the present first exposure time T1 by "q". For example, "q" is 1.1 and is set in the register in the controller 208. Similarly, when increasing the first exposure time T1, the controller 208 multiplies the present first exposure time T1 by "s". For example, "s" is 1.3 and is set in the register in the controller 208. Similarly, when greatly increasing the first exposure time T1, the controller 208 multiplies the present first exposure time T1 by "u". For example, "u" is 1.5 and is set in the register in the controller 208.

To increase or reduce the second exposure time T2, the controller 208 performs the same processing as the processing for increasing or reducing the first exposure time T1. That is, when slightly increasing the second exposure time T2, for example, the controller 208 multiplies the present second exposure time T2 by "p". For example, "p" is 0.9 and is set in the register in the controller 208. Similarly, when reducing the second exposure time T2, for example, the controller 208 multiplies the present second exposure time T2 by "r". For example, "r" is 0.7 and is set in the register in the controller 208. Similarly, when greatly reducing the second exposure time T2, for example, the controller 208 multiplies the present first exposure time T1 by "v". For example, "v" is 0.5 and is set in the register in the controller 208.

When slightly increasing the second exposure time T2, the controller 208 multiplies the present second exposure time T2 by "q". For example, "q" is 1.1 and is set in the register in the controller 208. Similarly, when increasing the second exposure time T2, the controller 208 multiplies the present second exposure time T2 by "s". For example, "s" is 1.3 and is set in the register in the controller 208. Similarly, when greatly increasing the second exposure time T2, the controller 208 multiplies the present second exposure time T2 by "u". For example, "u" is 1.5 and is set in the register in the controller 208.

As an example of processing for bringing the average luminance close to the target value, when increasing luminance, the controller 208 increases the luminance to t=1.4 times of the present average luminance and, when reducing the luminance, the controller 208 reduces the luminance to t=0.6 times of the present average luminance.

When slightly reducing, reducing, or greatly reducing the first exposure time T1, the controller 208 may raise (the target value/the number of saturated pixels) to the power of "$\gamma$" and multiply the first exposure time T1 by (the target value/the number of saturated pixels)$^\gamma$. For example, "$\gamma$" is 0.1 in the case of the slight reduction, is 0.2 in the case of the reduction, and is 0.3 in the case of the great reduction. On the other hand, when slightly increasing, increasing, or greatly increasing the first exposure time T1, the controller 208 may raise (the target value/the number of saturated pixels) to the power of "$\beta$" and multiply the first exposure time T1 by (the target value/the number of saturated pixels)$^\beta$. For example, "$\beta$" is 0.1 in the case of the slight increase, is 0.2 in the case of the increase, and is 0.3 in the case of the great increase.

Similarly, when slightly reducing, reducing, or greatly reducing the second exposure time T2, the controller 208 may raise (the target value/the number of black pixels) to the power of "$\gamma$" and multiply the second exposure time T2 by (the target value/the number of black pixels)$^\gamma$. For example, "$\gamma$" is 0.1 in the case of the slight reduction, is 0.2 in the case of the reduction, and is 0.3 in the case of the great reduction. On the other hand, when slightly increasing, increasing, or greatly increasing the second exposure time T2, the controller 208 may raise (the target value/the number of black pixels) to the power of "$\beta$" and multiply the second exposure time T2 by (the target value/the number of saturated pixels)$^\beta$. For example, "$\beta$" is 0.1 in the case of the slight increase, is 0.2 in the case of the increase, and is 0.3 in the case of the great increase.

Furthermore, when slightly reducing, reducing, or greatly reducing the first exposure time T1, the controller 208 may multiply the first exposure time T1 by (1+(the target value/the number of saturated pixels−1))×δ. For example, "δ" is 0.1 in the case of the slight reduction, is 0.2 in the case of the reduction, and is 0.3 in the case of the great reduction. On the other hand, when slightly increasing, increasing, or greatly increasing the first exposure time T1, the controller 208 may multiply the first exposure time T1 by (1+(the target value/the number of saturated pixels−1))×θ. For example, "θ" is 0.1 in the case of the slight increase, is 0.2 in the case of the increase, and is 0.3 in the case of the great increase.

Similarly, when slightly reducing, reducing, or greatly reducing the second exposure time T2, the controller 208 may multiply the second exposure time T2 by (1+(the target value/the number of black pixels−1))×δ. For example, "δ" is 0.1 in the case of the slight reduction, is 0.2 in the case of the reduction, and is 0.3 in the case of the great reduction. On the other hand, when slightly increasing, increasing, or greatly increasing the second exposure time T2, the controller 208 may multiply the second exposure time T2 by (1+(the target value/the number of black pixels−1))×θ. For example, "θ" is 0.1 in the case of the slight increase, is 0.2 in the case of the increase, and is 0.3 in the case of the great increase.

Figure 8:
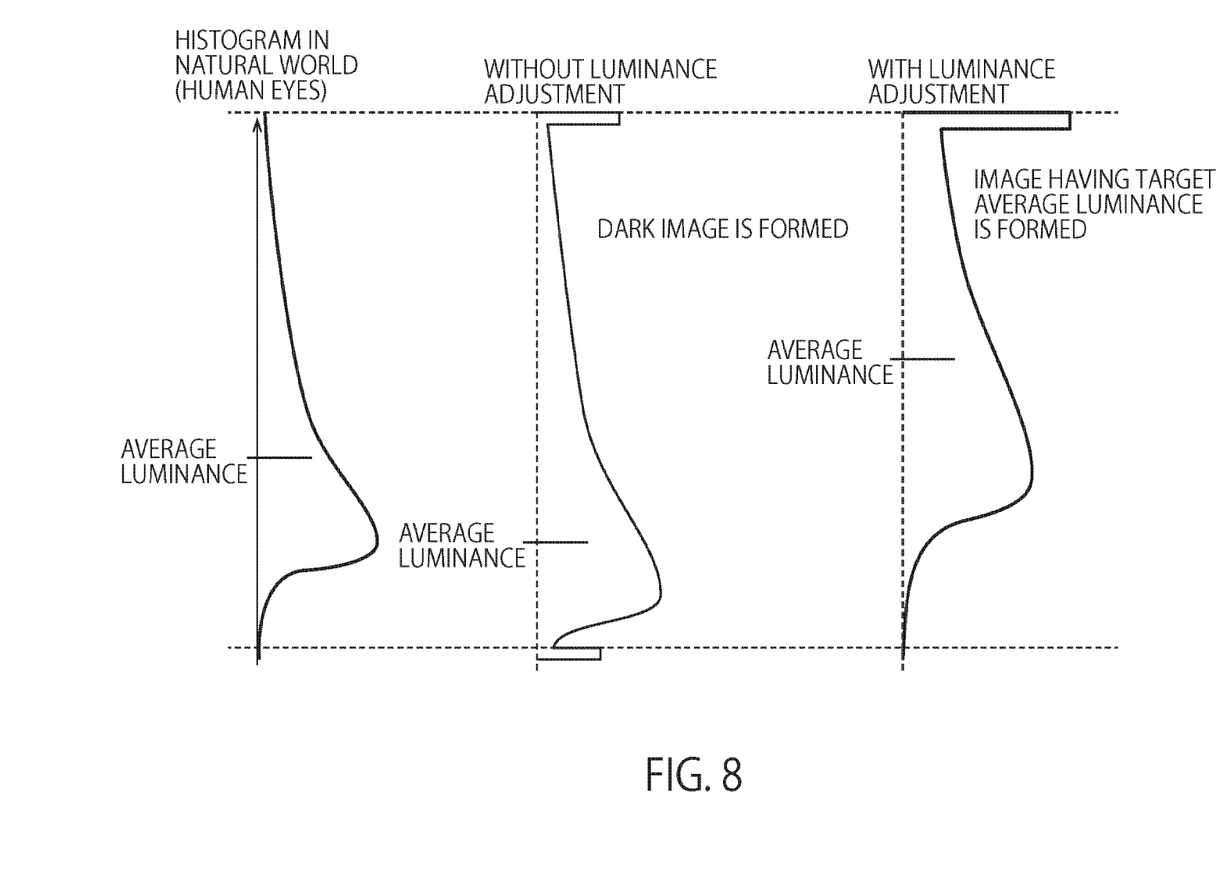
FIG. 8 is a diagram showing a processing effect example.

FIG. 8 is a diagram showing a processing effect example. A figure on the left side is a diagram showing a visual sense characteristic of a human. A figure in the middle is a diagram showing an example in which the number of saturated pixels and the number of black pixels are adjusted without performing luminance adjustment. A figure on the right side is a diagram showing an example in which the luminance adjustment and the adjustment of the number of saturated pixels and the number of black pixels are performed by the imaging control device 20 in this embodiment. The vertical axis of the left figure indicates luminance and the horizontal axis indicates vision sensitivity. The vertical axis of the middle figure and the right figure indicates luminance and the horizontal axis indicates the number of pixels.

As indicated by the vision sensitivity of the left figure, it is said that luminance sensitivity of the human eyes includes, for example, average luminance and vision sensitivity on a high-luminance side is higher than vision sensitivity on a low-luminance side. On the other hand, in the middle figure in which the luminance adjustment is not performed, a value of the average luminance is further on the low-luminance side than in the left figure. An image is less easily visually recognized. On the other hand, in the right figure in which the luminance adjustment is performed, the value of the average luminance is further on the high-luminance side than in the middle figure. An image is more easily visually recognized than in the middle figure. In this way, when the luminance adjustment and the adjustment of the number of saturated pixels and the number of black pixels are performed, the average luminance can be adjusted to the human vision sensitivity and the number of saturated pixels and the number of black pixels can also be adjusted.

Figure 9:
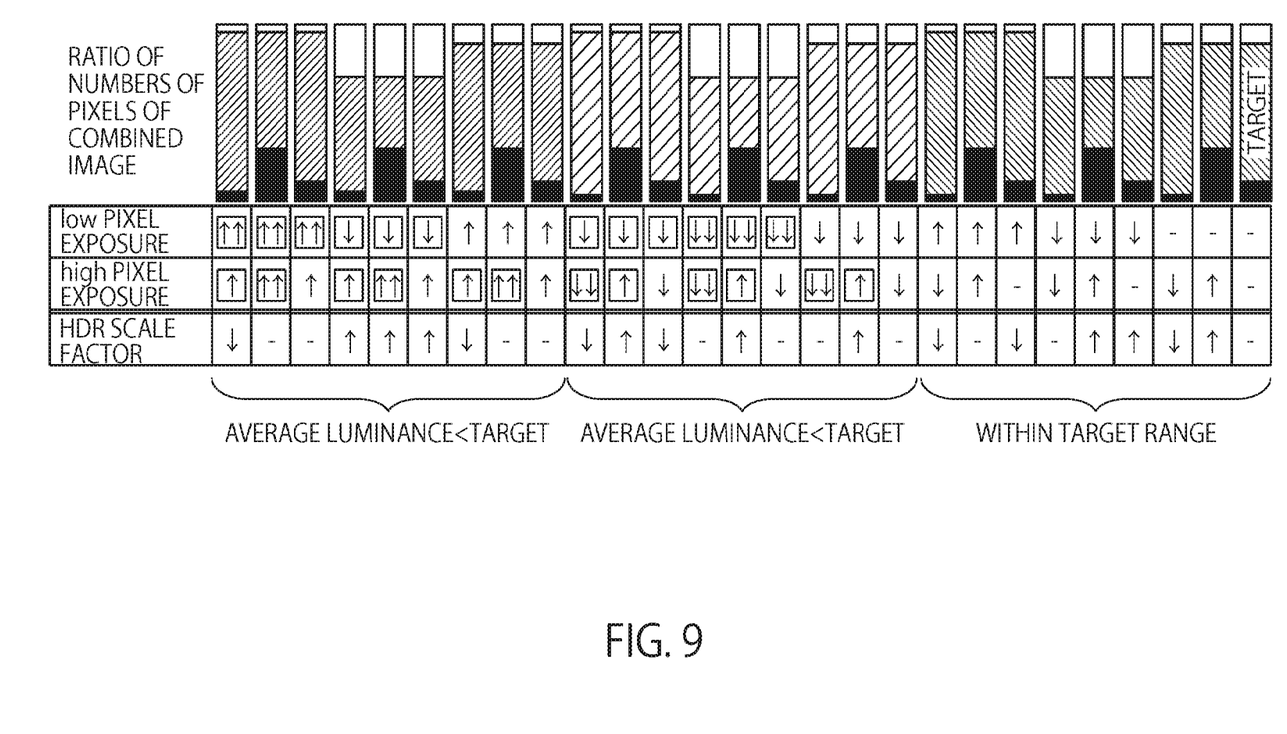
FIG. 9 is a control conceptual diagram of the first and second exposure times in the case in which the number of branches is increased.

FIG. 9 is a control conceptual diagram of the first and second exposure times in the case in which the number of processing branches is increased. In bar graphs on the upper side, the horizontal axes indicate each of the combined images and the vertical axes indicate ratios of saturated pixels, black pixels, and other pixels as shades. In FIG. 9, white indicates the ratio of the saturated pixels and black indicates the ratio of the black pixels. Three kinds of patterns indicate the ratio of the pixels other than the saturated pixels and the black pixels. Average luminance is indicated by the difference of the patterns. One arrow surrounded by a square indicates that an increase or decrease amount is smaller than an increase or decrease amount indicated by an arrow not surrounded by a square. Conversely, two arrows surrounded by a square indicate that an increase or decrease amount is larger than an increase or decrease amount indicated by an arrow not surrounded by a square.

In figures on the lower side of the bar graphs, low pixel exposure corresponds to the first exposure time T1, high pixel exposure corresponds to the second exposure time T2, and a ratio of the first exposure time T1 and the second exposure time T2 is indicated by the combination scale factor. An upward arrow indicates an increase, a downward arrow indicates a decrease, and "–" indicates that there is no increase and decrease. An increase or decrease amount of the first exposure time T1 and the second exposure time T2 is indicated by the number and the length of the arrows. The bar graph at the right end indicates an example of a target value. That is, in the bar graph at the right end, the number of saturated pixels corresponds to the ratio of the target number of saturated pixels, the number of black pixels corresponds to the ratio of the target number of black pixels, and gray corresponds to the target luminance value of the pixels other than the saturated pixels and the black pixels.

Figure 10:
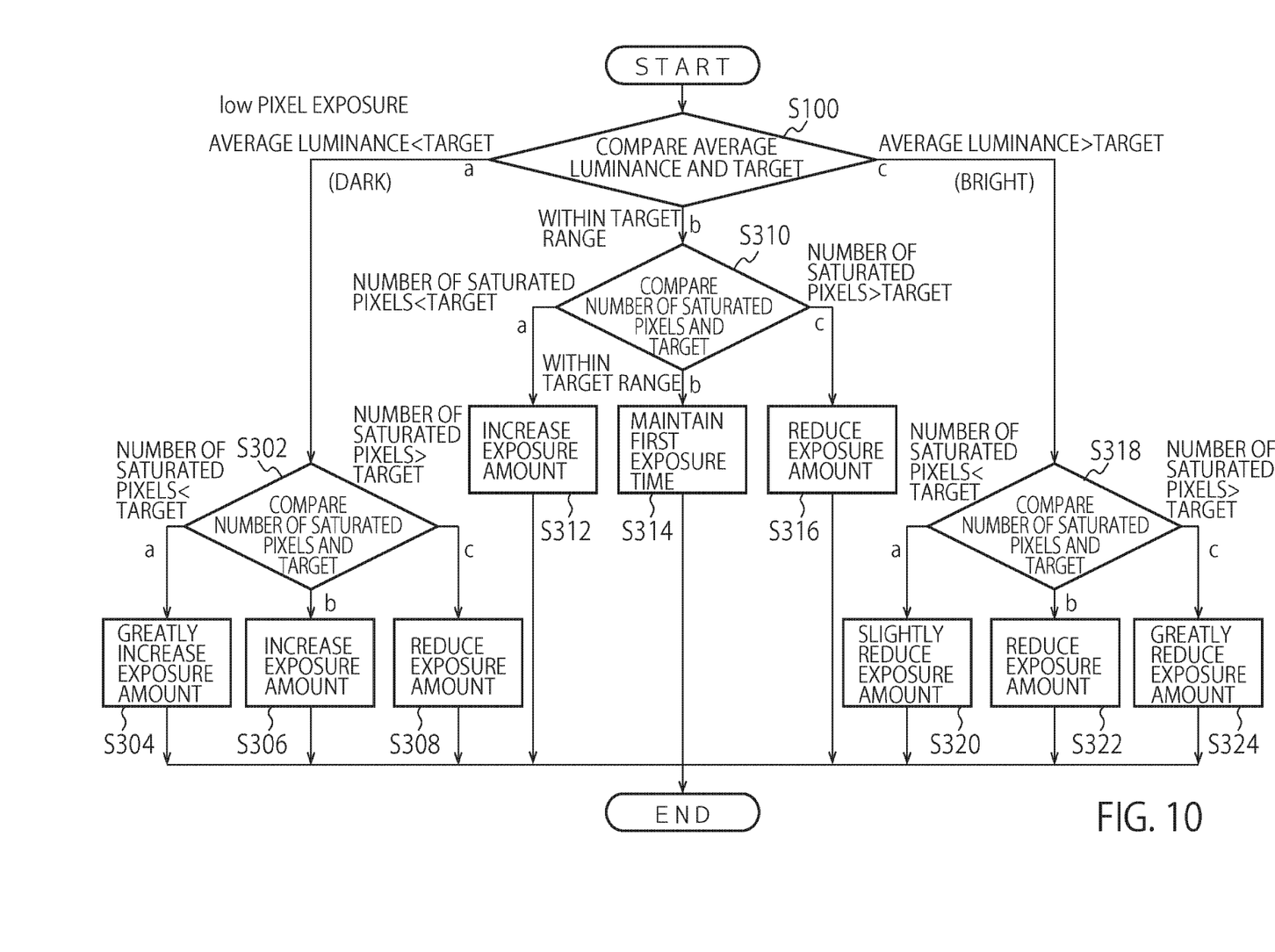
FIG. 10 is a flowchart for explaining a control example of the first exposure time in the case in which the number of branches is increased.

FIG. 10 is a diagram showing, in a form of a flowchart, the control example shown in FIG. 9 and is a flowchart for explaining a control example of the first exposure time T1. As shown in FIG. 10, first, the controller 208 compares the average luminance value and the target value of the combined image (step S100).

When the average luminance value is lower than the predetermined range of the target value ("a" in step S100), the controller 208 compares the number of saturated pixels and the number-of-saturated-pixels target value (step S302). When the number of saturated pixels is smaller than the predetermined range of the target value ("a" in step S302), the controller 208 performs control for greatly increasing the first exposure time T1 (step S304). On the other hand, when the number of saturated pixels is within the predetermined range of the target value ("b" in step S304), the controller 208 performs control for increasing the first exposure time T1 (step S306). On the other hand, when the number of saturated pixels is larger than the predetermined range of the target value ("c" in step S302), the controller 208 performs control for reducing the first exposure time T1 (step S308).

On the other hand, when the average luminance value is within the predetermined range of the target value ("b" in step S100), the controller 208 compares the number of saturated pixels and the number-of-saturated-pixels target value (step S310). When the number of saturated pixels is smaller than the predetermined range of the target value ("a" in step S310), the controller 208 performs control for increasing the first exposure time T1 (step S312). On the other hand, when the number of saturated pixels is within the predetermined range of the target value ("b" in step S310), the controller 208 performs control for maintaining the first exposure time T1 (step S314). On the other hand, when the number of saturated pixels is larger than the predetermined range of the target value ("c" in step S310), the controller 208 performs control for reducing the first exposure time T1 (step S316).

On the other hand, when the average luminance value is higher than the predetermined range of the target value ("c" in step S100) and the number of saturated pixels is smaller than the predetermined range of the target value ("a" in step S318), the controller 208 performs control for slightly reducing the first exposure time T1 (S320). On the other hand, when the number of saturated pixels is within the predetermined range of the target value ("b" in step S318), the controller 208 performs control for reducing the first exposure time T1 (step S322). On the other hand, when the number of saturated pixels is larger than the predetermined range of the target value ("c" in step S318), the controller 208 performs control for greatly reducing the first exposure time T1 (step S324). In this way, the controller 208 of the exposure time controller 202 changes the increase or decrease amount of the first exposure time T1 according to any one of the case in which the number of saturated pixels is within the predetermined range of the target value, the case in which the number of saturated pixels is larger than the predetermined range of the target value, and the case in which the number of saturated pixels is smaller than the predetermined range of the target value.

Figure 11:
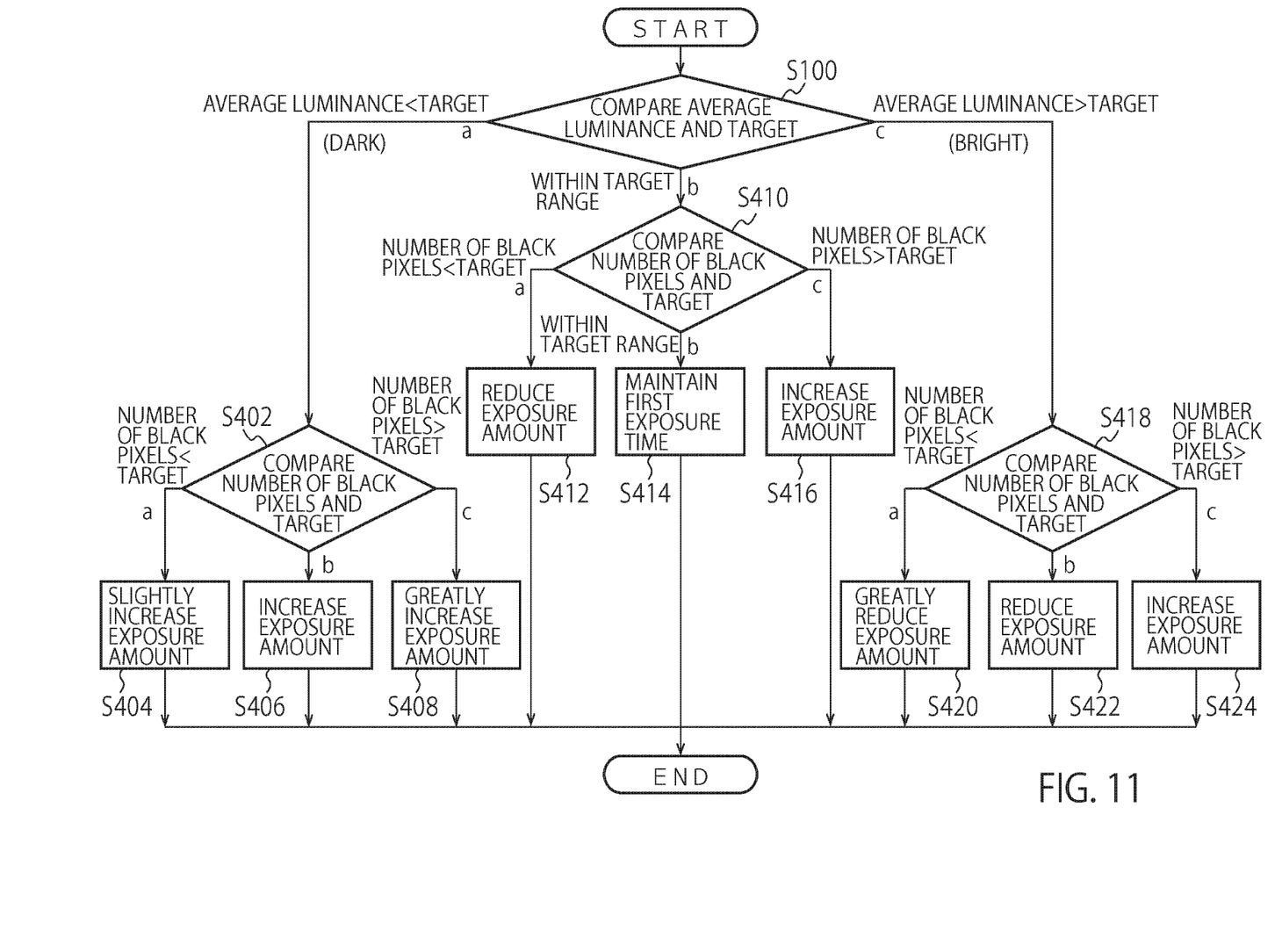
FIG. 11 is a flowchart for explaining a control example of a second exposure time in the case in which the number of branches is increased.

FIG. 11 is a diagram showing, in a form of a flowchart, the control example shown in FIG. 9 and is a flowchart for explaining a control example of the second exposure time T2. As shown in FIG. 11, first, the controller 208 compares the average luminance value and the target value of the combined image (step S100).

When the average luminance value is lower than the predetermined range of the target value ("a" in step S100), the controller 208 compares the number of black pixels and the number-of-black-pixels target value (step S402). When the number of black pixels is smaller than the predetermined range of the target value ("a" in step S402), the controller 208 performs control for slightly increasing the second exposure time T2 (step S404). On the other hand, when the number of black pixels is within the predetermined range of the target value ("b" in step S404), the controller 208 performs control for increasing the second exposure time T2 (step S406). On the other hand, when the number of black pixels is larger than the predetermined range of the target value ("c" in step S402), the controller 208 performs control for greatly increasing the second exposure time T2 (step S408).

On the other hand, when the average luminance value is within the predetermined range of the target value ("b" in step S100), the controller 208 compares the number of black pixels and the number-of-black-pixels target value (step S410). When the number of black pixels is smaller than the predetermined range of the target value ("a" in step S410), the controller 208 performs control for reducing the second exposure time T2 (step S412). On the other hand, when the number of black pixels is within the predetermined range of the target value ("b" in step S410), the controller 208 performs control for maintaining the second exposure time T2 (step S414). On the other hand, when the number of black pixels is larger than the predetermined range of the target value ("c" in step S410), the controller 208 performs control for increasing the second exposure time T2 (step S416).

On the other hand, when the average luminance value is higher than the predetermined range of the target value ("c" in step S100), the controller 208 compares the number of black pixels and the number-of-black-pixels target value (step S418). When the number of black pixels is smaller than the predetermined range of the target value ("a" in step S418), the controller 208 performs control for greatly reducing the second exposure time T2 (step S420). On the other hand, when the number of black pixels is within the predetermined range of the target value ("b" in step S418), the controller 208 performs control for reducing the second exposure time T2 (step S422). On the other hand, when the number of black pixels is larger than the predetermined range of the target value ("c" in step S418), the control section 208 performs control for increasing the second exposure time T2 (step S424). In this way, the controller 208 of the exposure time controller 202 changes the increase or decrease amount of the second exposure time T2 according to any one of the case in which the number of black pixels is within the predetermined range of the target value, the case in which the number of black pixels is larger than the predetermined range of the target value, and the case in which the number of black pixels is smaller than the predetermined range of the target value.

As explained above, according to this embodiment, the exposure time controller 202 controls at least one of the first exposure time and the second exposure time on the basis of at least one of the number of saturated pixels having the pixel values equal to or larger than the predetermined value and the black pixels having the pixel values equal to or smaller than the predetermined value and the value concerning the luminance value of the combined image. Consequently, it is possible to perform control of the first exposure time and the second exposure time considering both of at least one of the number of saturated pixels and the number of black pixels and the value concerning the luminance value.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An imaging control device comprising:
a combiner configured to generate a combined image on the basis of a first image captured in a first exposure time and a second image captured in a second exposure time longer than the first exposure time; and
an exposure time controller configured to control at least one of the first exposure time and the second exposure time on the basis of a number of pixels of at least one of saturated pixels having pixels values equal to or larger than a predetermined value and black pixels having pixel values equal to or smaller than the predetermined value in the combined image and a value concerning a luminance value of the combined image
wherein the exposure time controller increases or reduces the first exposure time according to the number of saturated pixels and sets different increase or decrease amounts when the value concerning the luminance value is higher than a target value and when the value concerning the luminance value is lower than the target value, and
the exposure time controller reduces the first exposure time when the value concerning the luminance value is higher than the target value and the number of saturated pixels is smaller than the target value and increases the first exposure time when the value concerning the luminance value is lower than the target value and the number of saturated pixels is equal to or larger than the target value.

2. The imaging control device according to claim 1, wherein the exposure time controller increases or reduces the first exposure time according to the number of saturated pixels and, when the value concerning the luminance value is within a predetermined range from a target value, increases the first exposure time when the number of saturated pixels is smaller than the target value and reduces the first exposure time when the number of saturated pixels is larger than the target value.

3. The imaging control device according to claim 1, wherein the exposure time controller changes an increase or decrease amount of the first exposure time according to any one of a case in which the number of saturated pixels is within a predetermined range of a target value, a case in which the number of saturated pixels is larger than the predetermined range of the target value, and a case in which the number of saturated pixels is smaller than the predetermined range of the target value.

4. An imaging control device comprising:
a combiner configured to generate a combined image on the basis of a first image captured in a first exposure time and a second image captured in a second exposure time longer than the first exposure time; and
an exposure time controller configured to control at least one of the first exposure time and the second exposure time on the basis of a number of pixels of at least one of saturated pixels having pixels values equal to or larger than a predetermined value and black pixels having pixel values equal to or smaller than the predetermined value in the combined image and a value concerning a luminance value of the combined image,
wherein the exposure time controller increases or reduces the second exposure time according to a number of black pixels and sets different increase or decrease amounts when the value concerning the luminance value is larger than a target value and when the value concerning the luminance value is smaller than the target value, and
the number of black pixels is smaller than the target value and increases the second exposure time when the value concerning the luminance value is smaller than the target value and the number of black pixels is smaller than the target value.

5. The imaging control device according to claim 1, wherein the exposure time controller increases or reduces the second exposure time according to the black pixels and, when the value concerning the luminance value is within a predetermined range from a target value, reduces the second exposure time when the number of black pixels is smaller than the target value and increases the second exposure time when the number of black pixels is larger than the target value.

6. The imaging control device according to claim 1, wherein the exposure time controller changes an increase or decrease amount of the second exposure time according to any one of a case in which the value concerning the luminance value is within a predetermined range of a target value, a case in which the number of black pixels is larger than the predetermined range of the target value, and a case in which the number of black pixels is smaller than the predetermined range of the target value.

7. An imaging control method comprising:
generating a combined image on the basis of a first image captured in a first exposure time and a second image captured in a second exposure time longer than the first exposure time; and
controlling at least one of the first exposure time and the second exposure time on the basis of a number of pixels of at least one of saturated pixels having pixels values equal to or larger than a predetermined value and black pixels having pixel values equal to or smaller than the predetermined value in the combined image and a value concerning a luminance value of the combined image,
wherein the controlling the at least one of the first exposure time and the second exposure time includes increasing or reducing the second exposure time according to a number of black pixels and setting different increase or decrease amounts when the value concerning the luminance value is larger than a target value and when the value concerning the luminance value is smaller than the target value, and
the controlling the at least one of the first exposure time and the second exposure time includes reducing the second exposure time when the value concerning the luminance value is larger than the target value and the number of black pixels is smaller than the target value and increasing the second exposure time when the value concerning the luminance value is smaller than the target value and the number of black pixels is smaller than the target value.

8. The imaging control method according to claim 7, wherein the controlling the at least one of the first exposure time and the second exposure time includes increasing or reducing the first exposure time according to the number of saturated pixels and setting different increase or decrease amounts when the value concerning the luminance value is higher than a target value and when the value concerning the luminance value is lower than the target value.

9. The imaging control method according to claim 7, wherein the controlling the at least one of the first exposure time and the second exposure time includes reducing the first exposure time when the value concerning the luminance value is higher than the target value and the number of saturated pixels is smaller than the target value and increasing the first exposure time when the value concerning the luminance value is lower than the target value and the number of saturated pixels is equal to or larger than the target value.

10. The imaging control method according to claim 7, wherein the controlling the at least one of the first exposure time and the second exposure time includes increasing or reducing the first exposure time according to the number of saturated pixels and, when the value concerning the luminance value is within a predetermined range from a target value, increasing the first exposure time when the number of saturated pixels is smaller than the target value and reducing the first exposure time when the number of saturated pixels is larger than the target value.

11. The imaging control method according to claim 7, wherein the controlling the at least one of the first exposure time and the second exposure time includes changing an increase or decrease amount of the first exposure time according to any one of a case in which the number of saturated pixels is within a predetermined range of a target value, a case in which the number of saturated pixels is larger than the predetermined range of the target value, and a case in which the number of saturated pixels is smaller than the predetermined range of the target value.

12. The imaging control method according to claim 7, wherein the controlling the at least one of the first exposure time and the second exposure time includes increasing or reducing the second exposure time according to the black pixels and, when the value concerning the luminance value is within a predetermined range from a target value, reducing the second exposure time when the number of black pixels is smaller than the target value and increasing the second exposure time when the number of black pixels is larger than the target value.

13. The imaging control method according to claim 7, wherein the controlling the at least one of the first exposure time and the second exposure time includes changing an increase or decrease amount of the second exposure time according to any one of a case in which the value concerning the luminance value is within a predetermined range of a target value, a case in which the number of black pixels is larger than the predetermined range of the target value, and a case in which the number of black pixels is smaller than the predetermined range of the target value.

* * * * *